United States Patent [19]

Young et al.

[11] Patent Number: 4,683,564
[45] Date of Patent: Jul. 28, 1987

[54] MATRIX SWITCH SYSTEM

[75] Inventors: Gladstone F. Young, Redding; Richard F. Green, Oxford, both of Conn.; S. David Miller, Buffalo, N.Y.; Thomas J. Quinlan, III, Norwalk, Conn.

[73] Assignee: Data Switch Corporation, Shelton, Conn.

[21] Appl. No.: 443,193

[22] Filed: Nov. 22, 1982

[51] Int. Cl.[4] ............................................. H04Q 11/04
[52] U.S. Cl. .................................. 370/63; 340/825.79
[58] Field of Search ............................. 370/59, 63, 64; 340/825.79, 825.8, 825.83

[56] References Cited

U.S. PATENT DOCUMENTS 4,046,963  9/1977  Adelaar ................................. 370/63
4,048,445  9/1977  Ghisler ................................. 370/63
4,060,698 11/1977  Birnie .................................. 370/63
4,178,483 12/1979  Lager et al. .......................... 370/63
4,393,381  7/1983  Seiden ............................. 340/825.83
4,480,328 10/1984  Alana .................................. 370/63

FOREIGN PATENT DOCUMENTS

0055944  7/1982  European Pat. Off. .

Primary Examiner—Douglas W. Olms
Assistant Examiner—Frank M. Scutch, III
Attorney, Agent, or Firm—St. Onge Steward Johnston & Reens

[57] ABSTRACT

A matrix switch system is described with which a large number of communication lines can be interconnected. The lines are arranged in multiplex groups which are in turn sampled by multiplexers. The multiplexers in turn are coupled to matrix lines which intersect at connectable crosspoints. A common timing signal with a predetermined minimum number of time slices is used to reconfigure the system during each time slice and form the desired line connections through the multiplexers and crosspoints for signal transfer. A technique is described to allocate time slices for the various connections of the lines and minimize matrix lock conditions.

29 Claims, 8 Drawing Figures

MATRIX SWITCH SYSTEM

FIELD OF THE INVENTION

This invention relates to a method and system for selectively connecting a large number of incoming lines to a large number of outgoing lines. More specifically, this invention relates to a method and system for selectively interconnecting a large number of communication lines carrying data to and from a large number of data terminals and data communication devices coupled to communicate with large scale signal processors.

BACKGROUND OF THE INVENTION

In the field of data communication a need exists to enable a large scale signal processor to communicate with a large number of data communication lines at a high data rate. For example, an airline reservation system handling data inquiries from all over the United States may be controlled by a central reservation control system. Such system normally includes a signal processor which must be able to communicate with a large number of data communication lines through data terminal and data communication equipment. Such data communication usually employs protocols and signals referred to as RS232 communications. Normally the signal processor operates at a very high speed so that it may service a large number of data communication lines even when these carry data at high rates. It is important in such system that communication between the data communication lines and the central processor unit be maintained and made essentially fault free.

Failures may occur in any area and equipment redundancies are employed to safeguard the central processor system against failures. In the part of the system to which the communication lines are coupled, a need exists to be able to switch lines from one equipment to another either to accommodate a failure or for such other purpose as appears necessary for the management or control of the central processor. One operational mode known as broadcasting may involve the momentary transmittal of the same message to a large number of lines. It is important that such mode be easily and quickly established with a minimum interference with other regular operations.

When a large number of data communication lines are to be connectable with each line formed of a large number of wires such as in excess of twenty as is common with RS 232 communication, the number of crosspoints and controllable connecting points of wires escalates to a cumbersome number. For example, with a 256×256 matrix, the number of crosspoints for a full size matrix would be in excess of 65,000 and the number of controllable connecting points of wires is in excess of one million for RS 232 communication lines. Such large number of connecting points are difficult to package in a small space as would be needed for high speed transmission of data.

Systems have been proposed and employed whereby a large number of data communication lines are coupled to a central processor through a switch. One such switch multiplexes all of the lines on each side of a crosspoint at a rate selected so that the through-put rate of the data on each line may meet a minimum required level. Such switch is limited in the number of lines it can handle lest the through-put data rate of the lines drops below the minimum required level. Such rate limitation becomes burdensome when one line requires a high through-put rate and needs to be sampled at a higher frequency. Such higher sampling rate can be accommodated, but at the expense of correspondingly reducing the sampling rate for other lines whose through-put data rate is then reduced. Such systems also suffer from lack of expandability.

For example, a commonly used data rate currently is 9600 baud per second. Higher data rates are frequently encountered such as 19.2K baud and higher. In order to pass data for each line at a high rate, the sampling speed for all lines must be sufficiently high.

When a large switch is considered, for example one that is capable of connecting any one of 256 incoming lines to any one of 256 outgoing lines, with each line capable of carrying 19.2K baud per second, the sampling rate for the multiplexing of all 256 lines requires an extraordinarily high sampling frequency. Such sampling frequency would be at least about 10 MHz to meet minimum Nyquist sampling rate requirements and practically a higher sampling rate would be necessary. When a larger number of lines is contemplated for a conventional switch, a correspondingly higher sampling frequency would be needed. However, in such case the higher sampling rate quickly leads to physical size limitations due to signal delays, noise, etc. As a practical matter, therefore, the switch size in conventional switches is limited because the sampling frequency cannot be indefinitely increased.

SUMMARY OF THE INVENTION

With a matrix switch system in accordance with the invention, the number of lines that can be interconnected can be made very large and effectively is not limited by sampling frequency requirements, yet high data rates on all of the incoming and outgoing lines can be accommodated. This is accomplished by forming the lines into groups which are time multiplexed onto lines leading to a matrix. The groups of lines are multiplexed at a high rate such that each line in the group is sampled at a sufficiently high frequency to accommodate high data rates on the lines. The lines leading to the matrix are connectable at crosspoints in the matrix in synchronization with the multiplexing of the lines in the groups so that at any one instant of time a line in any one group on one side of the matrix is connectable to at least one line in any other group at another side of the matrix.

With a matrix switch system in accordance with the invention the matrix can be expanded by adding multiplexed groups that are connectable to lines leading to the matrix. The size of the matrix may in this manner be significantly expanded to as large as may be required and without imposing data rate limitations on the lines.

As described herein with reference to one matrix switch system in accordance with the invention, a recurring timing signal is generated that is divided into sequential time slices. The timing signal is applied to activate multiplexers used to sample groups of lines. The outputs of the multiplexers are connected to matrix lines. The matrix lines are connectable at crosspoints by a control that operates synchronously with the multiplexers. For example, when a particular time slice occurs, a line in a group on one side of the matrix is coupled to a matrix line that is, during the same time slice, coupled to at least another matrix line through a crosspoint. During that same time slice the latter matrix line is coupled by another multiplexer to a particular line in another group. Hence, during that time slice the entire matrix switch system is briefly configured to couple a line in a group to another line in another group. Many lines can be coupled to many other lines during each time slice. The number of slices is selected so that a line in any one group on one side of the matrix may be connected to at least one line in any other group at another side of the matrix.

This process is repeated at the frequency of the time slices in the timing signal and the configuration of the entire matrix system may be set at this rate as appears desired to manage and control the flow of data between lines connected to the system.

One aspect of a matrix switch system in accordance with the invention resides in the selection of the configuration of the matrix switch system. This selection may be rapidly implemented under computer control which provides separate instructions to controls coupled to different parts of the matrix switch system.

In one such system in accordance with the invention, a matrix is provided with a control whereby lines on a port side of the matrix are connectable at selectable crosspoints to matrix lines on a channel side of the matrix. The terms port and channel as used herein have been adopted for convenience to denote two different matrix sides. The communication lines leading to the port side of the matrix are formed into groups that are respectively sampled by multiplexers. Each line in a group may be serviced by a multiplexer which momentarily couples a line to a port side matrix line. Similar multiplexers are operative at the channel side of the matrix. A matrix control for the crosspoints of the matrix is used.

Each multiplexer and the matrix control is provided with a circulating type memory with which configuration instructions for the connections of communication lines are carried out. The memory contents may be changed by a computer to alter the instructions and thus control the configuration of the matrix switch system. With a matrix system in accordance with the invention, the flow of data to and from the several communication lines may be controlled in a manner whereby rapid configuration changes can be adopted.

Another aspect of the invention involves an efficient technique for storing desired configurations for line connections and correspondingly alter such configurations in a rapid and efficient manner. This involves the use of a memory table that stores system configurations wherein locations represent port and channel line sources and port and channel line destinations and the data at these locations represent time slices and opposite matrix side sources and destinations. Memory linking tables are employed whereby the several destinations of a line are rapidly and conveniently determined. With such tables new line connections with appropriate time slice allocations are precisely and effeciently made.

Another aspect of the invention resides in the use of a plurality of available timing signal generators, one of which is automatically brought into the operation whenever the currently used generator fails.

It is, therefore, an object of the invention to provide a matrix switch system with which a large number of communication lines may be connected to each other in any configuration yet with each line capable of carrying a high data rate. It is another object of the invention to provide a control for a matrix switch system whereby it may be reconfigured in a rapid manner.

These and other objects and advantages of the invention can be understood from the following description of an embodiment described in conjunction with the drawings.

DETAILED DESCRIPTION OF DRAWINGS

Figure 1:
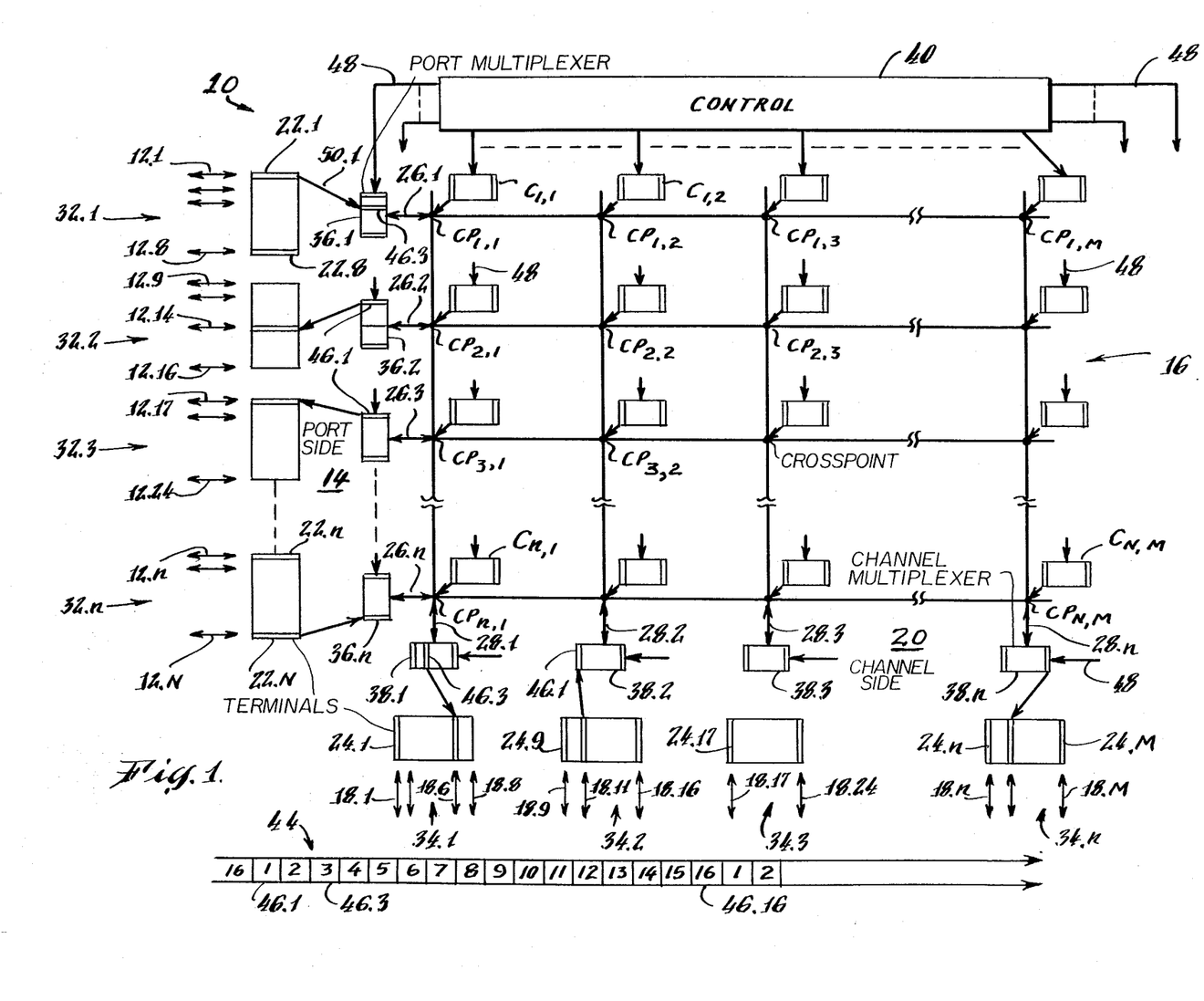
FIG. 1 is a block diagram of a matrix switch system in accordance with the invention.

With reference to FIG. 1 a matrix switch system 10 in accordance with the invention is shown for coupling any one of a number of data communication lines 12 (12.1 through 12.N) on a port side 14 of a matrix 16 to any one or a number of data communication lines 18 (18.1 through 18.M) on a channel side 20 of the matrix 16. The lines are generally referred to as 12 or 18 depending on which matrix side they are located on and individual lines are identified by the same numeral but with the addition of a particular decimal number. This technique for identifying many similar but differently located lines and components is employed throughout the following description.

The data communication lines 12 and 18 are of the type enabling two-way communication and employing RS232 protocol and signals though this invention may function with other communication lines. Each line may thus act both as a source (SRC) and a destination (DEST) of data. The lines 12, 18 are normally respectively connected to data terminal equipment (DTE) 22 and data communication equipment (DCE) 24. The latter equipment present data on a plurality of lines, all of which together are referred to as a single line as is conventional in the description of data communication switches.

In the embodiment of FIG. 1 any one line 12 on the port side 14 is connectable to any one or more lines 18 on the channel side 20 and similarly, any channel line 18 is connectable to any one or more port lines 12. In this manner incoming data may be connected to any or all outgoing lines and data may flow in both directions. When an incoming line is coupled to more than one outgoing line, the connection is considered as a broadcasting mode.

The matrix 16 is formed by rows of matrix port lines 26 and columns of matrix channel lines 28, all of which are connectable at crosspoints $CP_{ij}$ in a manner so that as shown by the double headed arrows, data may flow two-way. The port and channel lines 26, 28 in matrix 16 are shown as single lines but in practice are typically formed with over twenty separate wires. Hence, when the matrix 16 is large, say an N×M matrix of 256×256 data communication lines, the total number of connectable wires at the crosspoints 26 can become impracticably large.

In the matrix switch system 10 in accordance with the invention, the communication lines 12, 18 are formed into groups 32, 34 of eight, each group being time multiplexed by port multiplexers 36 and channel multiplexers 38. The multiplexers are controlled with a central control 40 which provides each multiplexer with the appropriate instructions for the coupling of port and channel lines 12, 18. Control 40 is, therefore, also shown coupled to crosspoint controls $C_{ij}$ which cause the proper crosspoint CP to be closed at the proper time commensurate with the desired interconnection between a line 12 and a line 18.

Operation of matrix switch system 10 commences with application by control 40 of interconnection instructions to multiplexers 36, 38 and crosspoint controls C. These instructions are stored in memories and are recurrently called upon to control the flow of data through matrix switch system 10. As part of control 40 a recurring timing signal such as 44 is provided which is divided into sixteen time slices 46.1–46.16. The timing signal is applied to multiplexers 36, 38 and cross-point controls CP as suggested by control lines 48 so that during each time slice 46 a line 12 may be coupled to a line 18.

For example, time slice 46.3, shown in the box for multiplexer 36.1, causes port line 12.1 to be sampled by multiplexer 36.1. Data on line 12.1, indicated as incoming to the port side by the direction of arrow 50.1, is passed through multiplexer 36.1, matrix port line 26.1, crosspoing $CP_{1,1}$, matrix channel line 28.1 and multiplexer 38.1 to channel line 18.6 on channel side 20.

In a similar manner during time slice 46.1 data arriving on line 18.11 is sampled by multiplexer 38.2 and coupled by matrix channel line 28.2 through crosspoints $CP_{2,2}$ and $CP_{2,3}$ to matrix port lines 26.2, 26.3 respectively. Multiplexers 36.2 and 36.3 pass the data on matrix lines 26.2 and 26.3 onto port lines 12.14 and 12.17.

Hence, during each time slice 46 a different matrix configuration is produced. It is not essential that a line in a group is always coupled to another line, as suggested for the channel lines 18.17–18.24. A line on one side may be coupled to none, one or all lines on the other side of the system 10 and a great amount of flexibility exists.

An advantageous aspect of the invention, however, is the formation of groups 32, 34 of the lines 12 and 18 and the use of multiplexers for each group before coupling data through matrix 16. In the example of FIG. 1, a total of 32 lines are connectable to any of another 32 lines, thus in effect creating 1024 crosspoints, but only using a matrix with 16 crosspoints. This is achieved without a reduction of through-put data rate for any channel.

For example, if the multiplexers are operated at a sufficiently high rate, of the order of three MHz, all lines 12 and 18 may carry data at rates of 19.2K baud. The matrix switch system 10 may then be expanded. In practice limitations tend to arise because increased size increases time delays and noise. All that is needed to expand is the addition of multiplexers 36 or 38 or both and matrix lines 26, 28 with crosspoints CP. The same timing signal 44 can be used. In this manner the matrix switch system may be increased such as to 256×256 lines and larger.

Figure 2:
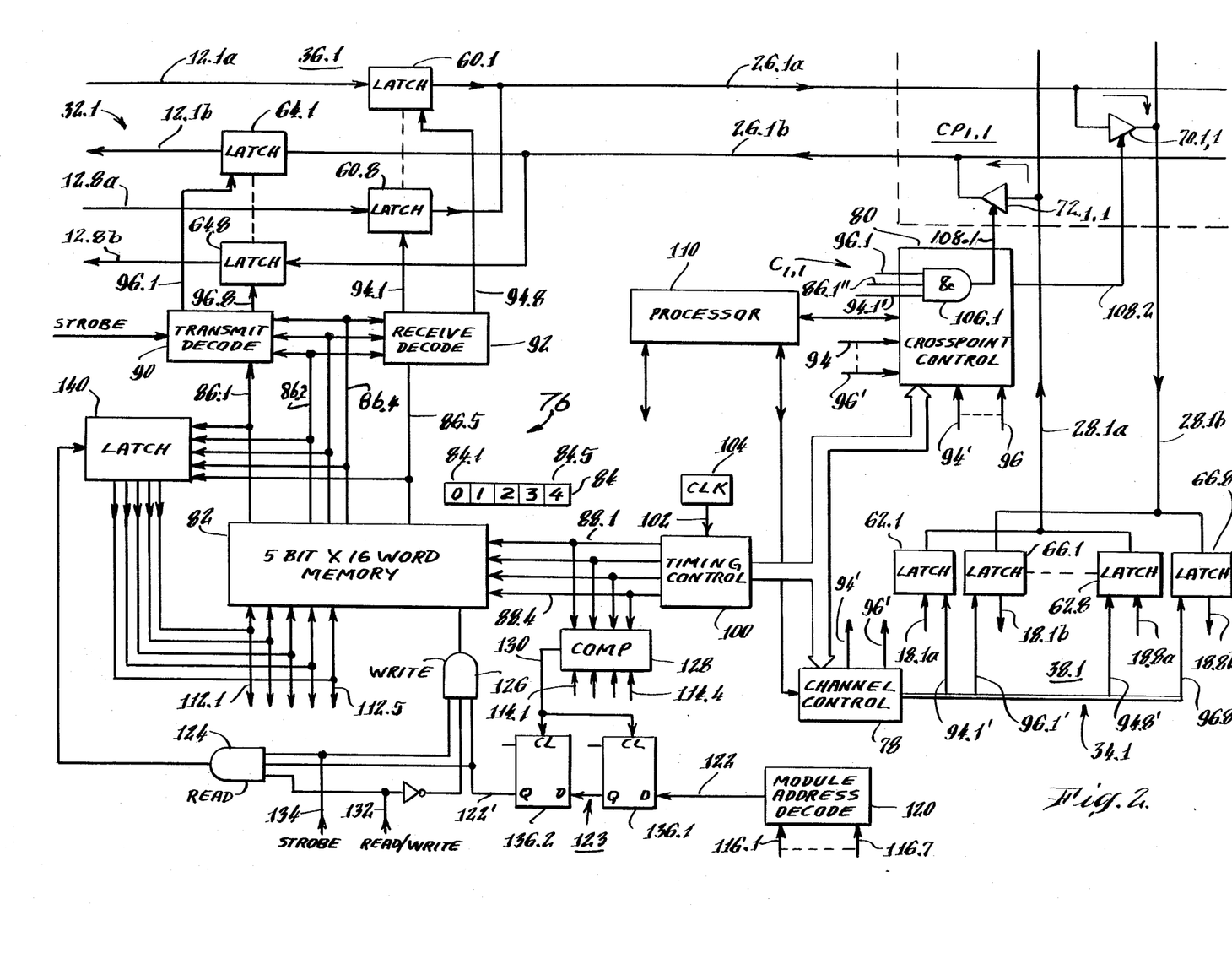
FIG. 2 is a schematic block diagram of a control for a matrix switch system in accordance with the invention.

FIG. 2 shows a portion of control 40 with multiplexers 36.1, 38.1 and crosspoint $CP_{1,1}$ as illustrative of the networks employed to implement the matrix switch system 10. The multiplexers 36.1, 38.1 are shown as effectively directly coupled to port lines 12 and channel lines 18 since the terminals 22, 24 that are normally employed have been deleted from the drawing for clarity. Multiplexers 36, 38 are each formed of a plurality of gated latches such as 60–62 to receive and gate through matrix 16 incoming data arriving on lines such as 12, 18 of groups 32, 34. Data that has been gated through matrix 16 is momentarily stored in latches such as 64, 66 for further transmittal. Latches 60, 62 may, for example, be convention D type flip flops.

The gating at each crosspoint CP employs gated amplifiers such as 70, 72 to respectively control the flow of data from matrix port line 26.1a to matrix channel line 28.1b or from matrix channel line 28.1a to matrix port line 26.1b. Data on each line 12 and 18 may thus flow in opposite directions subject to the control exercised by multiplexer controls 76, 78 and crosspoint controls 80.

These controls are substantially alike and, therefore, only control 76 for multiplexer 36.1 is shown in detail. A five bit by 16 word long memory 82 is shown which presents its five bit words, such as 84, on output lines 86 in sequence as determined by recurring timing signal 44 applied to memory 82 on lines 88.

The five bit words in memory 82 comprise enabling bits on lines 86.1 and 86.5 to enable decode networks 90, 92 which are respectively assigned to decode the remaining three bits on lines 86.2–86.3. The decode networks 90, 92 present enabling signals on lines 94 and 96 in correspondence to whether line 86.1 (bit 84.1) or line 86.5 (bit 84.2) or both are active. The appropriate gated latch 60 and latch 64 are enabled in accordance with the value represented by bits 84.3–84.5 to respectively pass an incoming signal on a port line 12 or store the value of an outgoing signal from a channel line 18 in a latch 64.

A recurring timing signal of the type as shown at 44 in FIG. 1 is generated by a timing control 100. The timing signal is in the form of a rapidly changing four bit word and is presented on lines 88.1–88.4. Such recurring timing signal may be produced with a four bit counter that continuously receives high speed clock pulses on a line 102 from a clock source 104. The value presented by each output of the counter represents one of the time slices 46 and with a four bit counter 16 time slices are produced. In the embodiment the time slice signals on lines 88.1–88.4 are in Gray code so that only one signal changes in level at any one time. The timing signal on lines 88.1–88.4 is effective to cause the contents of memory 82 to be sequentially presented on lines 86.1–86.5 and thus correspondingly activate the appropriate latch 60 and/or latch 64.

The channel control 78 is identical in structure as control 76 and crosspoint control 80 may be alike except for its memory 82 which need only be a two bit by 16 word memory. In the embodiment crosspoint control 80 relies upon signals decoded in port and channel controls 76, 78 to activate a crosspoint C. In practice this means that signals on enabling lines such as 94, 96 in port control 76 and similar signals on lines 94', 96' in channel control 78 are applied to a decode network in the form of AND gates in crosspoint control 80. For example, to actuate crosspoing $CP_{1,1}$ so that data can flow from matrix line 28.1a through gate $72._{1,1}$ to matrix line 26.1b, latch enabling line 96.1 from decode network 90 and latch enabling line 94.1' are applied together with a bit output of the two bit memory 82 (not shown) in a control 80 to an AND gate such as 106.1. The latter's output 108.1 is coupled to the control input of gated amplifier 72.1.1 to enable the flow of data between matrix lines 28.1a and 26.1b during the proper time slice. All controls 76, 78 and 80 are activated by the same timing signal from timing control 100.

One advantageous aspect of the invention involves the technique for determining which time slice 46 is to be used to transfer data between lines 12 and 18. As shown in FIG. 2, this is obtained with a programmable signal processor 110 which presents time slice instructions in the form of five bit words on output lines 112.1–112.5 and related four bit time slice identification words on output lines 114.1–114.4. Lines 112.1–112.5 are bidirectional in that information may flow from processor 110 and may be entered into memory 82 and the latter's contents may be read into processor 110. In addition, processor 110 addresses the appropriate control such as 76 with a module address code on output lines 116.1–116.7.

When processor 110 seeks to address a control such as 76, the address code is decoded by a network 120 which, when it is the correct code for control 76, stores and generates an enabling signal that is applied on line 122 to AND gates 124, 126 after synchronization with the timing signal 44 with a network 123. A comparator 128 produces an enabling signal on output 130 when the time slice signals on lines 88.1–88.4 match the time slice allocation word on lines 114.1–114.5. If, after two such comparisons, the processor 110 also provides an appropriate write instruction on a line 132, the time slice instruction word on lines 112.1–112.5 is entered at the proper location in memory 82 when a strobe pulse occurs on line 134. AND gate 126 thus serves to gate new time slice instructions into memory 82. Networks such as 123 are employed to synchronize the synchronous instructions from signal processor 110 with timing signals from timing control 100. Network 123 is shown formed of a pair of cascade connected D flip flops 136.1 and 136.2 whose clock inputs are driven by the signals on comparator output 130. As a result, at least one whole timing signal cycle, i.e. a cycle including all time slices 46 (see FIG. 1) will have occurred before control 76 will act on an instruction from processor 110 and thus signal conflicts are avoided.

Control 76 is also provided with an ability to read the contents of any one or all time slice instructions in memory 82. This is done by storing the memory time slice instructions as they appear on lines 86.1–86.5 in a latch network 140 when the output of the read AND gate 124 goes active. The stored instruction is entered via lines 112.1–112.5 into processor 110 when a read instruction level signal is present on line 132 and the other input conditions for AND gate 124 have been met. Processor 110 is programmed to read the lines 112.1–112.5 and act on their information, for example by comparing the contents of memory 82 with the time slice instructions stored for that memory in processor 110.

Once time slice instructions have been stored in each of the controls 76, 78, 80, the operation of matrix switch system 10 is automatic and does not require intervention by processor 110. The latter may be used to monitor various functions of system 10 such as the presence of proper time slice instructions and the operation of the system 10 by testing all of its circuits with appropriate data signals.

Figure 3:
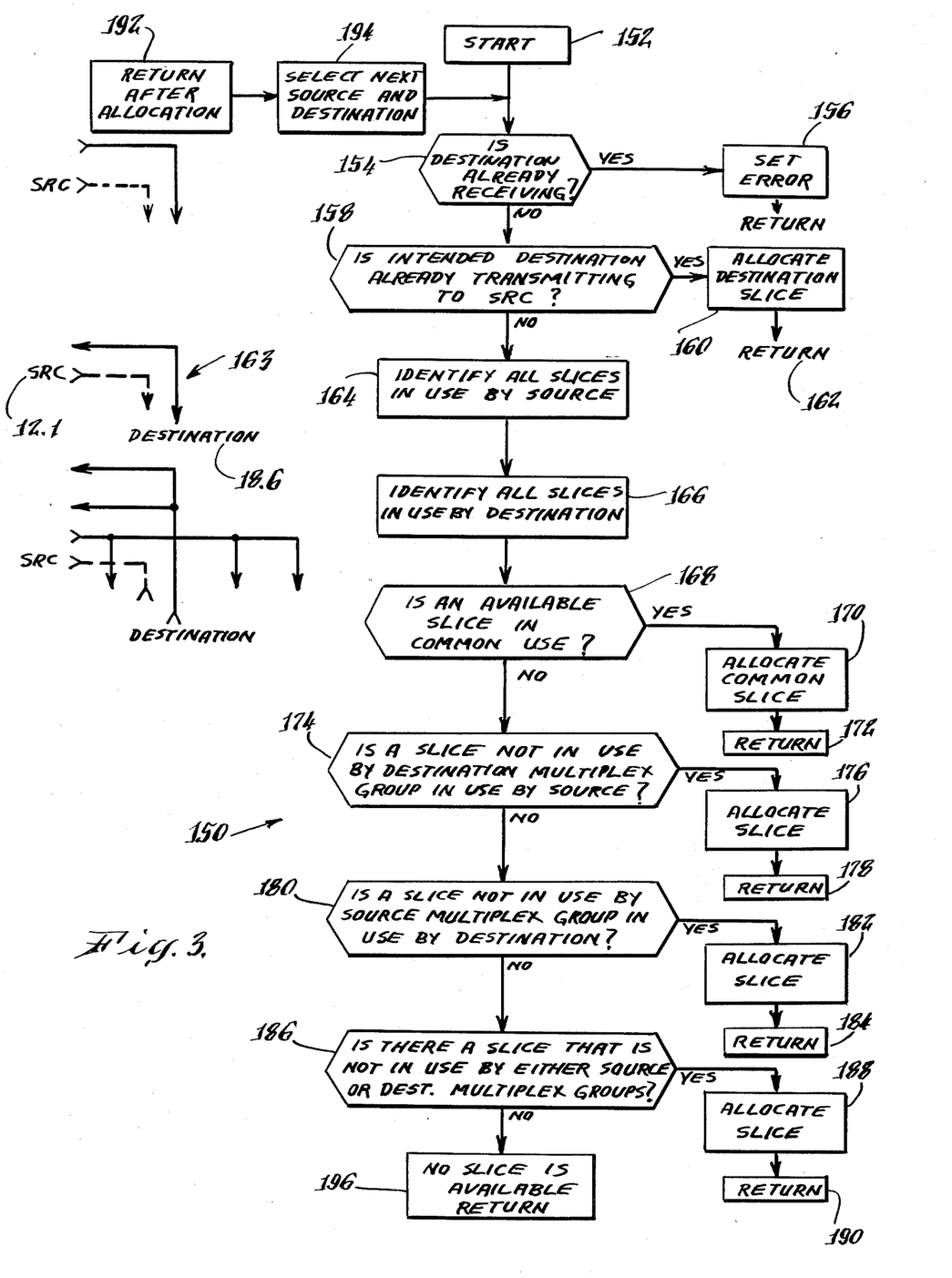
FIG. 3 is a flow chart for use in a signal processor employed in the control of a matrix switch system in accordance with the invention.

When the matrix switch system 10, however, is to be reconfigured such as when a new line 12 is to be connected to a line 18 or connections are to be changed, a time slice must be allocated to the new line or changed connection. When system 10 is initially set up to connect port lines 12 to channel lines 18, care must be taken that available time slices are used efficiently. FIG. 3 illustrates a technique 150 with which time slices for the transmission of data to and from the communication lines 12, 18 are determined.

A basic requirement is imposed on the operation of system 10 in that a source, or line, can transmit to any one or all destinations or other lines, but a destination or line can receive from only one source or line. Thus, if port line 12.1 is transmitting a data signal to a channel line 18.1, the latter cannot receive data from any other line. On the other hand, line 12.1 could transmit to just channel line 18.1 alone or all of the channel lines 18.

In technique 150 once a time slice is allocated to a line in a multiplex group 32 or 34, no other line within the group may make use of the time slice. However, lines outside the group may use the same time slice, provided the time slice is available within that other group. A line 12 or 18 may transmit and/or receive during a common time slice. In determining the best time slice, technique 150 will try to allocate a time slice that is already in use before allocating a new time slice. This will assure that a time slice will be available for all future connections.

In technique 150 it is assumed that processor 110 has already been provided with data representative of desired connections for matrix switch system 10. Thus a desired configuration map may be considered to be stored in processor 110 representative of the particular desired connections for lines 12, 18 and in which directions data is to flow between the lines. The technique commences by examining the lines to be connected from the viewpoint of whether a source can be connected to a destination.

Commencing at 152, processor 110 first tests at step 154 whether a desired destination, e.g. line 18.6, is already receiving. If so, then this violates the basic rule for system connections and an error flag is set at 156 to warn the operator of system 10 that the desired connection to line 18.6 cannot be implemented. In the line connection shown in FIG. 1 such is not the case.

Step 158 then examines whether the destination line is already acting as a source for the line for which a connection is being sought. If so, at step 160 the time slice allocated for that existing source is allocated and a return is made at 162. For example, with reference to FIG. 1 and the diagram at 163 along step 158 in FIG. 3, if the destination of data on line 18.6 is to be line 12.1, then time slice 46.3 is allocated for that connection because line 12.1 is already acting as a source for line 18.6. In practice this means that, with reference to FIG. 2, the time slice instruction would include enabling bits in both bit positions 84.1 and 84.2 for time slice 46.3 and both decode networks 90, 92 in each of the controls 76, 78, and the appropriate gate 106 in control 80 would be activated during this time slice.

If the test 158 result is negative, all slices in use by the source (12.1) are identified at 164 and similarly all slices in use by the intended destination are identified at 166 as to suitability. At 168 a test is made whether there is a time slice in common use by the source, i.e. line 12.1 and the destination (e.g. line 18.6). If so, then at 170 the common time slice is allocated and a return is made at 172.

At step 174 a test is made whether a slice that is not in use by any one of the lines in the group to which the destination belongs is in use by the source. For example, with reference to FIG. 1, if line 12.1 is to act as a source to line 18.6, then the time slices not in use by any other line in group 34.1 are compared with other time slices employed by line 12.1. If the comparison identifies such time slice, it is allocated at 176 and a return is made at 178.

If test 174 is negative, a comparison is made at 180 whether a time slice that is not in use by any line in the multiplex group to which the source belongs is in use by the destination. If so, the common slice is allocated at 182 and a return made at 184. For example, with reference to FIG. 1, any time slice that is not in use by any other line in group 32.1 but in use by the desired destination 18.6, would be an acceptable time slice and thus allocated at 182.

In the event test 180 is not passed, an examination is made at step 186 whether there exists a time slice that is not in use by any one of the lines in the multiplex groups to which the source and destination belong. If so, such unused time slice is allocated at 188 and a return is made at 190.

Whenever a time slice allocation is obtained, a return is made to step 192 so that at 194 the next desired connection of a source and destination is passed through the technique 150 to assign an appropriate time slice.

Figure 4:
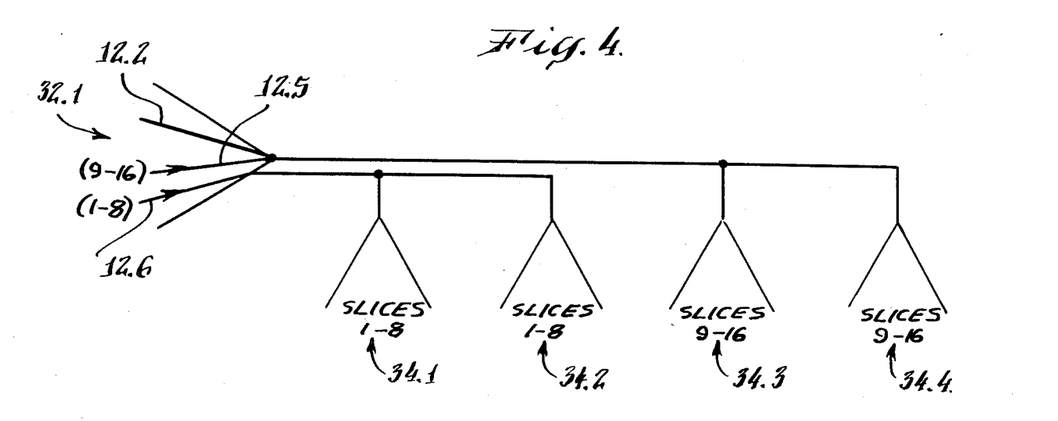
FIG. 4 is a schematic representation of a partial matrix switch configuration.

Although in practice a time slice allocation is made for desired connections, it is possible that in a broadcasting mode as illustrated in FIG. 4, no time slices are available for allocation to new connections. In FIG. 4 line 12.6 broadcasts to all lines 18 in multiplex groups 34.1 and 34.2 during time slices 46.1–46.8 and line 12.5 broadcasts to all lines 18 in groups 34.3 and 34.4 during time slices 46.9–46.16. When a connection for line 12.2 in group 32.1 is sought, no time slices are available and the technique 150 would cause a return at 196 with a warning to the operator that the desired interconnection cannot be made. Such matrix lock-up is avoidable by distributing the destinations in groups 34.1–34.4 to different multiplex groups 34, thus allowing greater multiple use of a time slice and requiring fewer different time slices for group 34.1.

An advantageous aspect of a matrix switch system 10 in accordance with the invention resides in the use of a number of time slices 46 that will be sufficient to form all desired connections for system 10. This number of time slices is primarily a function of the number of lines in a multiplex group such as 32 or 34. If the number of groups on a side is less than the number of lines in a group, the minimum number of time slices can be reduced.

Figure 5:
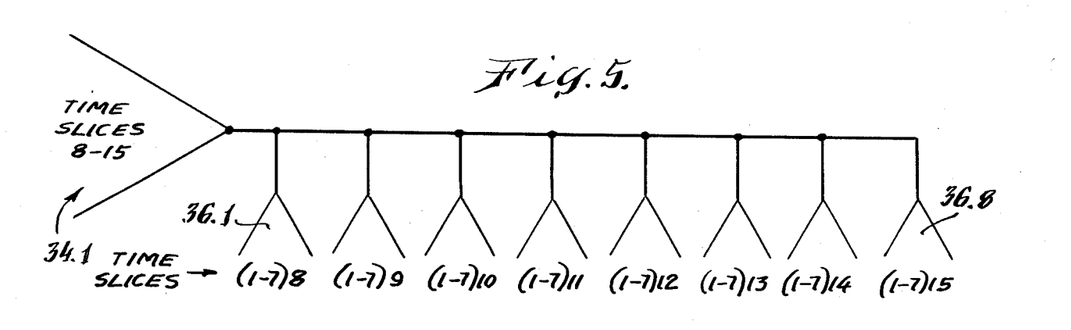
FIG. 5 is a schematic representation of another partial matrix switch configuration.

When the number of lines in each group 32 is P and in each channel group 34 is Q, the minimum number of time slices necessary to enable any one line to be connected to any one other line is $P+Q-1$. This minimum number of time slices that may be required can be understood from the following example, with reference to FIG. 5. In this figure a worst case configuration for system 10 is shown when a port group 34.1 is to be connected to lines in channel groups 36.1–36.8 in each of which the lines are already connected during time slices 46.1–46.7. In such case, time slices 46.8–46.15 are needed to enable a line in group 34 to connect to any one of the lines in groups 36.1–36.8.

In the event fewer groups 36 are used, such as four in the embodiment of FIG. 1, the minimum number of time slices can be reduced to seven. In the embodiment the number of time slices is rounded to the next highest convenient multiple binary, namely, sixteen. The matrix switch system 10 can be conveniently expanded to a larger matrix using eight groups on both the port and channel sides of the matrix 16.

When broadcasting modes are contemplated such as when any one line is to be connectable to any one or more of other lines, the number of time slices necessary to guarantee a connection increases. In such case the minimum number of time slices is determined by the product $P \times Q$. When each multiplex group has eight lines ($P=Q=8$) then 64 time slices are needed. Such large number is difficult to accommodate and other techniques such as described with reference to FIG. 4 can be employed to increase the number of available time slices. Another technique may involve circuitry (not shown) for the temporary direct connection of receiving lines in a broadcasting mode to a transmitting line.

When a large matrix switch system 10 is used, the total number of crosspoints that can be formed is very large, in excess of 65,000 for a $256 \times 256$ system. The memory storage required to store the instruction for each connection would be very large, particularly if a separate memory location is assigned for each connection. Also, in the process of allocating time slices as described with reference to FIG. 3, it is desirable to avoid having to check the contents of 56,000 memory locations for the availability of a time slice.

Figure 6:
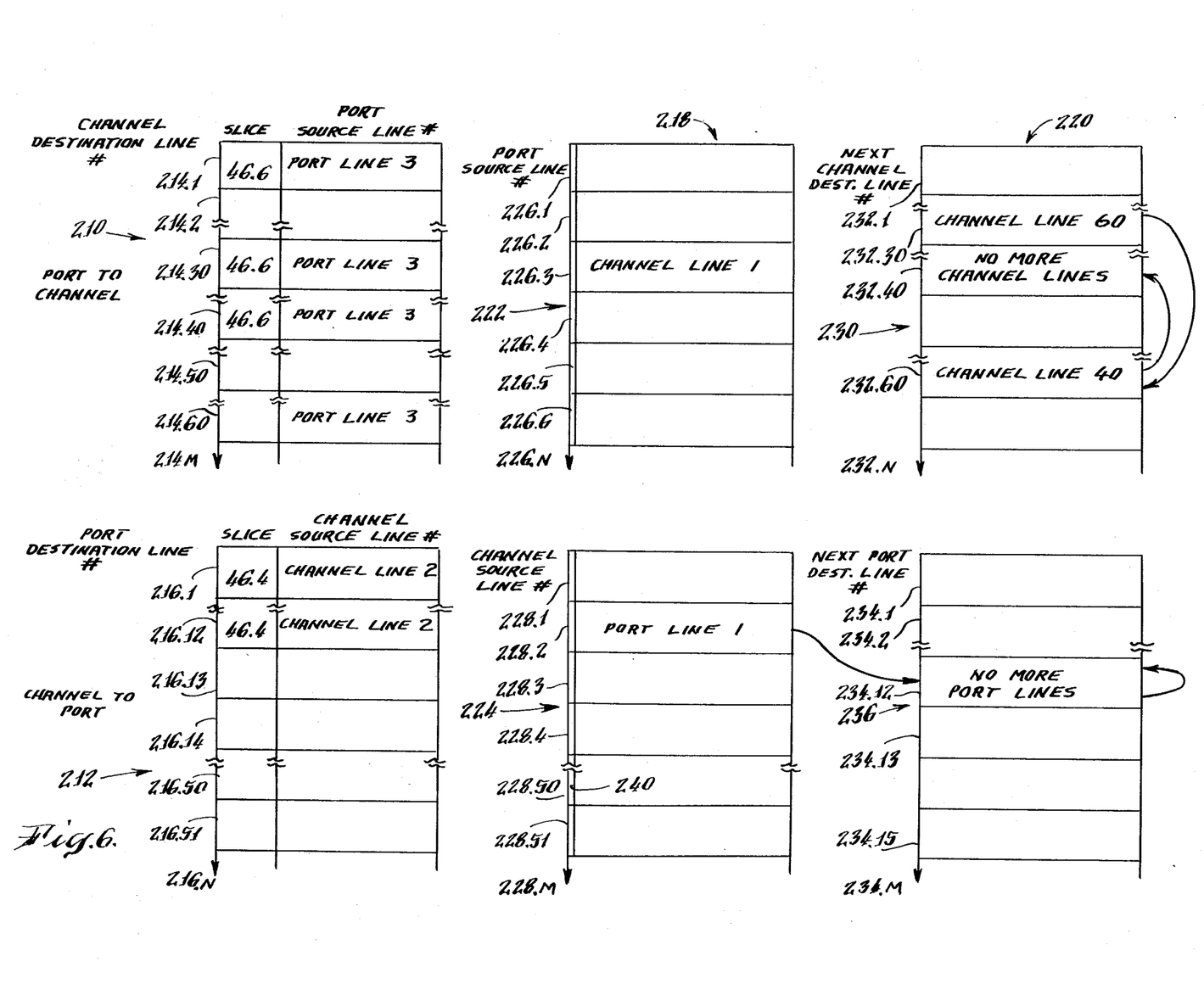
FIG. 6 is a schematic representation of a memory storage of a matrix configuration for use in the control of a matrix switch system in accordance with the invention.

The line connection information is, therefore, organized in a processor memory in a manner as shown in FIG. 6. In this Figure memory segments 210, 212 are shown which respectively contain connection data at locations 214.1–214M and 216.1–216.N. Locations 214.1–214.M each represent the channel line that is a destination so as to receive data while the data stored at that location identifies the port line source as well as the time slice when such data is to be received from the port line source.

Correspondingly, locations 216.1–216.N each represent the port line that is a destination for a channel line source while the data stored at that location identifies the particular channel line source and time slice when such data is to be received.

The information stored in memory segments 210, 212 provides a complete configuration map for the matrix switch system 10, yet for a $256 \times 256$ system, only 512 memory locations are needed. In order to enhance use of the map represented by memory segments 210, 212, signal processor 110 derives two additional maps 218, 220.

Map 218 is formed of two memory segments 222, 224 which respectively contain data at locations 226.1–226.N and 228.1–228.M. Locations 226.1–226.N each represent a port line source 12 while the data stored in the locations represents the channel line destination to which the data from the port line source is to be transmitted. The data in locations 226.1–226.N further identify in memory segment 230, if applicable, the next location 232 to which data from a port line source is to be coupled. Each location 232, therefore, represents a channel line that is a destination while the data in each location 232 identifies either a next channel destination line or none.

In a similar manner, memory segment 224 in map 218 includes locations 228 each of which represents a channel line as a source of data while the data in each location 228 represents the port line that is to receive the data and thus act as a destination. In addition, the data in locations 228 identify, if applicable, a next location 234 in memory segment 236 of map 220. The locations 234 represent the next port line destination while the data in each location 234 identifies either a next port line destination or none if such is the case.

With the tables 218, 220 in FIG. 6, the steps of allocating time slices as set forth in FIG. 3 are conveniently implemented. For example, when it is desired to connect channel line 50 to port line 3 so that channel line 50 is to receive data from port line 3, tests such as 154 and 158 of FIG. 3 are rapidly performed. For test 154 (whether line 50 is already acting as a receiver during any one time slice) location 214.50, see FIG. 6, in memory segment 210 is checked for the presence of data. For test 158 (whether line 50 is a source for port line 3) location 228.50 in memory segment 224 is checked for the presence of data, such as by checking the first bit 240 in the location. If data were present, the slice information would be derived from the port destination identified in the data of location 228.50 and then looking up the slice identification in location 216.50 of memory segment 212.

When step 164 of FIG. 3 is to be performed, all destinations of data from port line 3 are identified commencing as shown in FIG. 6 with the data in location 226.3 of memory segment 222, and the other memory locations linked by the data, such as locations 232.60 and 232.40. All the time slices employed for transmission of data by port line 3 are then obtained by looking at the time slice data for these channel destinations in memory segment 210.

A similar routine is followed for implementing step 166 of FIG. 3 but using the memory segments 212, 224 and 236 as shown in FIG. 6. The other tests in FIG. 3 are similarly advantageously executed with the use of the tables of FIG. 6.

Figure 7:
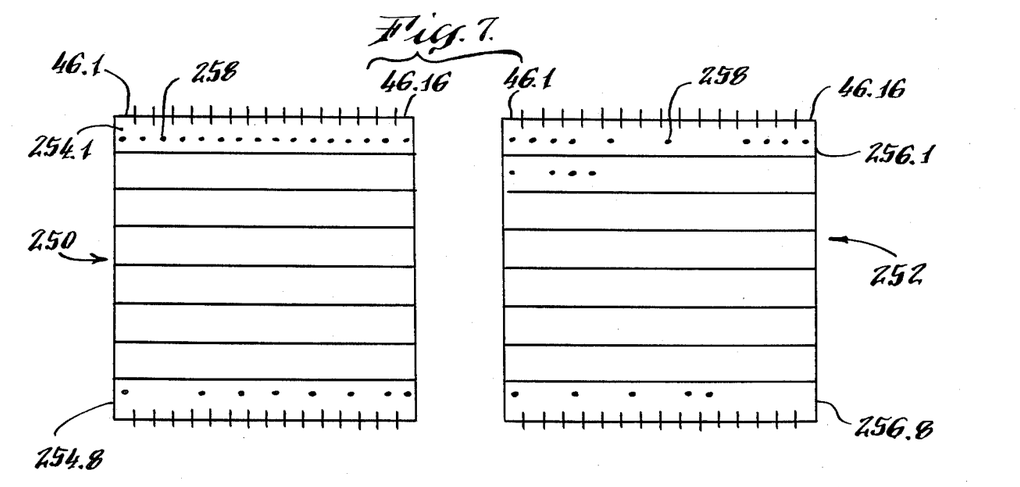
FIG. 7 is a schematic representation of a memory storage of time slice allocations as employed in the control of the matrix in accordance with the invention.

As part of the slice allocation process, memory time slice maps are employed as suggested in FIG. 7. These maps comprise two memory segments 250, 252, respectively composed of N divided by 8 and M divided by 8 locations 254, 256 corresponding respectively to the number of port groups 32 (see FIG. 1) and channel groups 34. Each location 254 and 256 (see FIG. 7) has an equal number of bits 258 as there are time slices 46. As a time slice allocation is made for a line in a group, the bit 258 corresponding to that time slice is turned on. The time slice maps are a convenient technique to maintain control over time slice allocations.

With the line connection tables of FIG. 6 and the time slice maps, memory size requirements are advantageously reduced. Line connections are established with an efficient use of memory. For example, for a 256×256 matrix switch system, less than 1600 memory locations are needed to store line connection data, yet in effect over 65,000 crosspoints are controlled.

Figure 8:
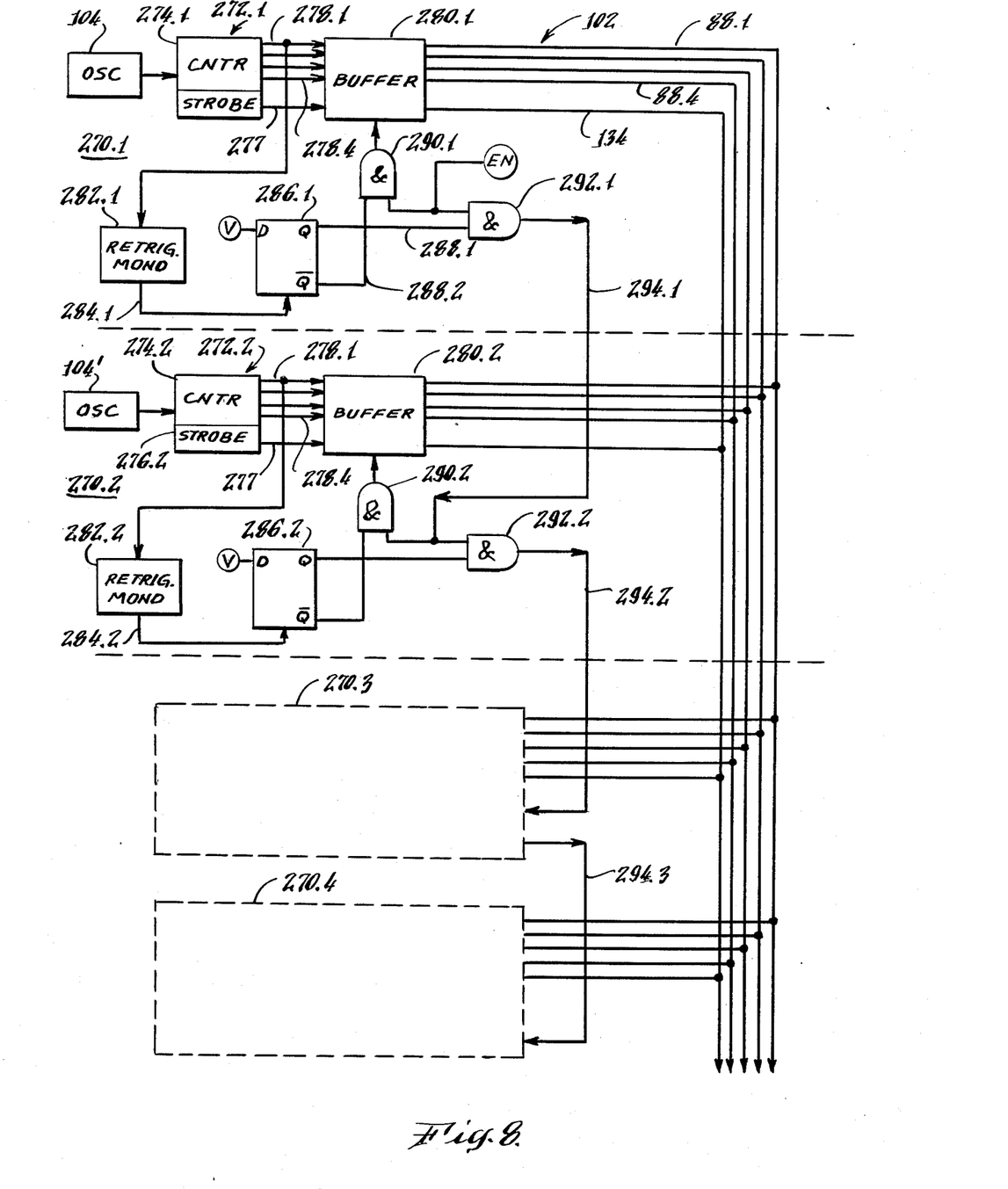
FIG. 8 is a schematic and block diagram of a timing control used in the matrix switch system of FIG. 2.

One aspect of the invention provides a reliable matrix switch system by employing redundancy of critical components. As can be seen from FIG. 2, the timing and control network 102 provides timing signals to all controls external of the signal processor 110. FIG. 8 illustrates a daisy type chain of networks 270 with which the generation of time slice signals on lines 88.1-88.4 is unlikely to fail.

Each network 270 includes an oscillator 104 feeding a network 272 that includes a four bit counter 274 and a strobe generator 276. The strobe signal on output 277 is derived from oscillator 104 and has a particular phase relationship with the four outputs 278 of counter 274. The counter output is, by use of appropriate converters that are not shown, presented in the form of a Gray code. As a result, only one output line 278 will change level at any one instant of time. The output lines 278 are coupled through a gated buffer 280 to timing slice lines 88.1-88.4.

One output line 278.1 is applied to a retriggerable monostable circuit 282 whose output 284 remains inactive as long as regular pulses on line 278.1 occur. When oscillator 104 fails so that pulses fail to occur on line 278.1, circuit 282 is permitted to trigger to clock a flip flop 286.

The flip flop outputs 288.1 and 288.2 respectively control AND gates 290 and 292 so that upon failure of a clock pulse, AND gate 290 is disabled whlie AND gate 292 is enabled. The output 294.1 of AND gate 292.1, when inactive, is applied as a disabling signal to AND gate 290.2 and AND gate 292.2 in network 270.2. However, when a clock fails in network 270.1, the output 294.1 of AND gate 292.1 goes active thereby presenting enabling inputs to both AND gates 290.2 and 292.2.

In the event network 270.1 had failed and timing signals from network 270.2 would be used, flip flop 286.2 enables AND gate 290.2 to thus allow time slice signals to be produced from buffer 280.2. In the event timing network 270.2 fails, the next network 270.3 is enabled and so on with network 270.4. In this manner one of four timing networks may be automatically brought into action whenever one fails, thus enhancing the reliability of the matrix switch system 10.

Having thus described a matrix switch system in accordance with the invention, its advantages can be appreciated. A large number of communication lines may be interconnected in a variety of desired configurations, yet each line connection may carry data at high rates. Variations from the described embodiment may be made by one skilled in the art. For example, analog signals on the communication lines may be switched by adopting appropriate analog to digital converters for incoming lines and d/a converters on outgoing lines if the latter conversion is desired. The scope of the invention, therefore, is to be determined from the following claims.

What is claimed is:

1. A matrix switch system for coupling a plurality of signals on incoming lines to outgoing lines and with lines associated with a matrix being located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable bidirectional communication between a port line and a channel line through a matrix crosspoint; said controlling means including:

means for generating a recurring timing signal having time slices; and means responsive to the timing signal for coupling during a common time slice a line that is a source of signals on one side of the matrix means to a plurality of lines located on another side of the matrix means.

2. A matrix switch system for coupling a plurality of signals on incoming lines associated with a matrix to outgoing lines associated with the matrix and with lines located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable communication between a port line and a channel line through a matrix crosspoint; said controlling means including:

means for generating a recurring timing signal having time slices; and means responsive to the timing signal for bidirectionally coupling, during a common time slice, a line in each one group on one side of the matrix means to a line in another group on another side of the matrix means so that for each time slice a line in each one group may be a source of signals for a line in a said other group and vice versa.

3. A matrix switch system for coupling a plurality of signals on incoming lines associated with a matrix to outgoing lines associated with the matrix and with lines located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable communication between a port line and a channel line through a matrix crosspoint; wherein said controlling means includes means for generating a recurring timing signal having a predetermined number of time slices, said timing signal being coupled to enable communication between port lines and channel lines through crosspoints during said time slices with the number of time slices being selected to assure that a line on one side of the matrix means can communicate with at least one line on another side of the matrix means.

4. A matrix switch system for coupling a plurality of signals on incoming lines associated with a matrix to outgoing lines associated with the matrix and with lines located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable communication between a port line and a channel line through a matrix crosspoint;

said controlling means including means for generating a recurring timing signal having a predetermined number of time slices, said timing signal being coupled to enable communication between port lines and channel lines through crosspoints during said time slices with the number of time slices being selected to assure that a line on one side of the matrix means can communicate with at least one line on another side of the matrix means;

means responsive to the timing signal for generating enabling signals to effect coupling between lines of different groups during each time slice, said enabling signals generating means having:

means respectively associated with the port and channel multiplexer means and the matrix means for storing time slice instruction signals; and means for applying said stored time slice instructions signals during corresponding time slices to the port and channel multiplexer means and matrix means to enable communication between a port line in a group to a channel line in a group through a crosspoint.

5. The matrix switch system as claimed in claim 4 wherein said time slice instruction signal applying means further comprises:

means associated with each group of lines for decoding said time slice instruction signals to produce said enabling signals.

6. The matrix switch system as claimed in claim 5 wherein said port and channel multiplexer means each include means actuated by said enabling signals for storing signals on port, channel, and matrix lines.

7. A matrix switch system for coupling a plurality of signals on incoming lines associated with a matrix to outgoing lines associated with the matrix and with lines located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable communication between a port line and a channel line through a matrix crosspoint;

said controlling means including means for generating a recurring timing signal having a predetermined number of time slices, said timing signal being coupled to enable communication between port lines and channel lines through crosspoints during said time slices with the number of time slices being selected to assure that a line on one side of the matrix means can communicate with at least one line on another side of the matrix means; said timing signal generating means producing during each recurring timing signal a predetermined number of time slices which number is equal or greater than $P+Q-1$, where P represents the number of lines in a group on a port side and Q represents the number of lines in a group on a channel side.

8. The matrix switch system as claimed in claim 7 wherein said timing signal generating means produces a predetermined number of time slices that is equal to the next highest binary multiple.

9. The matrix switch system as claimed in claim 7 wherein said timing signal generating means produces during each timing signal a predetermined number of time slices which is at least equal to the product $P \times Q$ where P represents the number of lines in a group on a port side and Q represents the number of lines in a group on a channel side.

10. A matrix switch system for coupling a plurality of signals on incoming lines associated with a matrix to outgoing lines associated with the matrix and with lines located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable communication between a port line and a channel line through a matrix crosspoint;

said controlling means including means for generating a recurring timing signal having a predetermined number of time slices, said timing signal being coupled to enable communication between port lines and channel lines through crosspoints during said time slices with the number of time slices being selected to assure that a line on one side of the matrix means can communicate with at least one line on another side of the matrix means;

means for allocating a time slice so that a line in a group on a port side and a line on a channel side may be effectively connected during said time slice said allocating means including means for storing allocated time slice instructions; and means for applying said stored allocated time slice instructions to said multiplexer means and matrix means to enable effective line connections in sequence with the application of said time slices.

11. A matrix switch system for coupling a plurality of signals on incoming lines associated with a matrix to outgoing lines associated with the matrix and with lines located on a port side and on a channel side of the matrix, comprising:

matrix means for coupling signals on matrix incoming lines to matrix outgoing lines, said matrix means having a plurality of crosspoints where matrix lines leading to one side are selectively coupled to matrix lines leading to another side;

a plurality of port multiplexer means coupled to multiplex respective groups of port lines with respectively different matrix lines leading to one side of crosspoints of the matrix means;

a plurality of channel multiplexer means coupled to multiplex respective groups of channel lines with respectively different matrix lines leading to other sides of crosspoints of the matrix means;

means for controlling said port and channel multiplexer means and said matrix means to enable communication between a port line and a channel line through a matrix crosspoint;

said controlling means including means for generating a recurring timing signal having a predetermined number of time slices, said timing signal being coupled to enable communication between port lines and channel lines through crosspoints during said time slices with the number of time slices being selected to assure that a line on one side of the matrix means can communicate with at least one line on another side of the matrix means;

means for allocating a time slice so that a line in a group on a port side and a line on a channel side may be effectively connected during said time slice, said time slice allocating means comprising means for rejecting a desired connection between lines for a time slice when the line that is representative of a destination of data is already receiving signals from a line during said latter time slice.

12. The matrix switch system as claimed in claim 11 wherein said time slice allocating means further comprises:

means for allocating for a desired effective connection between lines a time slice during which a receiving line is transmitting to a line between which said connection is desired.

13. The matrix switch system as claimed in claim 12 wherein said time slice allocating means further comprises:

means for allocating a time slice which is in use by all of the lines desired to be effectively connected.

14. The matrix switch system as claimed in claim 13 wherein said time slice allocating means further includes:

means for allocating a time slice that is not used by any one of the lines in the group containing the receiving line that is desired to be effectively connected to.

15. The matrix switch system as claimed in claim 14 wherein said time slice allocating means further inlcudes:
means for allocating a time slice that is not used by any one of the lines in the group containing the transmitting line that is desired to be effectively connected to.

16. The matrix switch system as claimed in claim 15 wherein said time slice allocating means further includes:
means for allocating a time slice that is not used by any one of the lines in the groups containing the lines desired to be effectively connected.

17. A method for effectively coupling a plurality of signals on incoming lines of a matrix to selected outgoing lines of the matrix comprising the steps of:
multiplexing groups of lines at a port side of the matrix so that a line in each group is momentarily coupled to respectively a port side located line of the matrix;
generating a recurring timing signal having a predetermined number of time slices, with the number of time slices being selected to assure that a line on one side of the matrix can be coupled to a line on the other side of the matrix;
closing selected crosspoints of the matrix during said time slices to cause a coupling between matrix port lines and matrix channel lines at said selected crosspoints;
selecting during said time slices a channel line from respective groups thereof to be coupled to respective matrix channel lines leading to the latter groups.

18. The method of claim 17 and further including the step of:
coupling, during a common time slice, the signals on a line on one side of a matrix to a plurality of lines on another side of the matrix.

19. The method as claimed in claim 17 and further comprising the step of:
allocating time slices so as to form said effective connections between lines.

20. The method as claimed in claim 19 wherein during each time slice only one line from any one group of lines is coupled to communicate in a selected direction with a matrix line leading to said one group.

21. The method as claimed in claim 20 wherein said allocating step includes the step of:
inhibiting communication during a time slice from one line to another line when said other line is already receiving signals from a line during said latter time slice.

22. A method for effectively coupling a plurality of signals on incoming lines associated with a matrix to selected outgoing lines associated with the matrix comprising the steps of:
multiplexing groups of lines at a port side of the matrix so that lines in the groups are momentarily coupled to respectively different port side located lines of a matrix;
multiplexing groups of lines at a channel side of the matrix so that lines in the groups are momentarily coupled to respectively different channel side located lines of the matrix;
generating a recurring timing signal having time slices, with the number of time slices being selected to enable a line on one side of the matrix to be coupled to any one line on the other side of the matrix;
closing selected crosspoints during said time slices to cause a coupling between matrix port lines and matrix channel lines at said selected crosspoints;
selecting during time slices a port line from respective groups thereof to be coupled to respective matrix port lines leading to the groups;
selecting during said time slices a channel line from respective groups thereof to be coupled to respective matrix channel lines leading to the groups; and with said time slices being in an amount that is equal to or greater than $P+Q-1$ wherein P is the number of lines in a group on the port side and Q is the number of lines in a group on the channel side.

23. The method as claimed in claim 22 wherein said timing signal generating step includes the step of:
producing in each timing signal said time slices in an amount that is at least equal to the product of $P \times Q$.

24. A method for effectively coupling a plurality of signals on incoming lines associated with a matrix to selected outgoing lines associated with the matrix comprising the steps of:
multiplexing groups of lines at a port side of the matrix so that lines in the groups are momentarily coupled to respectively different port side located lines of a matrix;
multiplexing groups of lines at a channel side of the matrix so that lines in the groups are momentarily coupled to respectively different channel side located lines of the matrix;
generating a recurring timing signal having time slices with the number of time slices being selected to enable a line on one side of the matrix to be coupled to any one line on the other side of the matrix;
closing selected crosspoints during said time slices to cause a coupling between matrix port lines and matrix channel lines at said selected crosspoints;
selecting during time slices a port line from respective groups thereof to be coupled to respective matrix port lines leading to the groups;
selecting during said time slices a channel line from respective groups thereof to be coupled to respective matrix channel lines leading to the groups;
allocating time slices so as to form said effective connections between lines, said allocating step further including the steps of:
storing in a memory a first table of data representative of line sources and slice allocations with the memory locations representative of port and channel line destinations; and
storing in memory tables of data representative of port and line channel destinations with the memory locations for said latter tables being representative of the port and channel line sources.

25. The method as claimed in claim 24 wherein said latter storing step includes the step of storing memory locations representative of additional line destinations of port and channel line sources.

26. The method as claimed in claim 25 wherein said latter storing step includes the step of storing in said latter memory location data representative of still further line destinations of port and channel line sources.

27. A method for effectively coupling a plurality of signals on incoming lines associated with a matrix to selected outgoing lines associated with the matrix comprising the steps of:

multiplexing groups of lines at a port side of the matrix so that lines in the groups are momentarily coupled to respectively different port side located lines of a matrix;

multiplexing groups of lines at a channel side of the matrix so that lines in the groups are momentarily coupled to respectively different channel side located lines of the matrix;

generating a recurring timing signal having time slices;

closing selected crosspoints during said time slices to cause a coupling between matrix port lines and matrix channel lines at said selected crosspoints;

selecting during time slices a port line from respective groups thereof to be coupled to respective matrix port lines leading to the groups;

selecting during said time slices a channel line from respective groups thereof to be coupled to respective matrix channel lines leading to the groups;

storing time slice instruction signals for each group of lines and said crosspoints;

circulating said stored time slice instruction signals; and applying said stored time slice instruction signals to synchronously effect said selecting steps.

28. A method for effectively coupling a plurality of signals on incoming lines associated with a matrix to selected outgoing lines associated with the matrix comprising the steps of:

multiplexing groups of lines at a port side of the matrix so that lines in the groups are momentarily coupled to respectively different port side located lines of a matrix;

multiplexing groups of lines at a channel side of the matrix so that lines in the groups are momentarily coupled to respectively different channel side located lines of the matrix;

generating a recurring timing signal having time slices;

closing selected crosspoints during said time slices to cause a coupling between matrix port lines and matrix channel lines at said selected crosspoints;

selecting during time slices a port line from respective groups thereof to be coupled to respective matrix port lines leading to the groups;

allocating time slices to effect said line connections by generating time slice instructions;

comparing said time slice instructions with said timing signal for a correspondence; and storing said time slice instructions to effect said selecting steps when the time slice instructions correspond with said timing signal.

29. The method as claimed in claim 28 and further comprising the step of:

reading said stored time slice instructions when said correspondence with the timing signal occurs.

* * * * *